Patented Sept. 15, 1936

2,054,271

UNITED STATES PATENT OFFICE 2,054,271

PRODUCTION OF CRYSTALLIZED HORMONE ESTERS

Erwin Schwenk, Berlin-Westend, and Friedrich Hildebrandt, Berlin, Germany, assignors to Schering-Kahlbaum A. G., Berlin, Germany No Drawing. Application April 7, 1933, Serial No. 665,039. In Germany May 17, 1932

3 Claims. (Cl. 260—103)

Our invention relates to hormones and more especially to the production of crystallized hormone esters. It is an object of our invention to provide means whereby crystallized esters of the female germinal gland hormones can be produced in a simpler and more efficient manner than was hitherto possible.

Hitherto the crystallized esters of the female germinal gland hormones have been produced by subjecting the crystallized hormones (the follicle hormone $C_{18}H_{22}O_2$ and the follicle hormone hydrate $C_{18}H_{24}O_3$) to acylation according to one of the well known methods (see Butenandt, "Untersuchungen über das weibliche Sexualhormon" (Weidmann'sche Buchhandlung, Berlin 1931), pages 61 to 62).

From the raw oils containing the germinal gland hormones, which are obtained when isolating these substances from their natural sources, crystallized esters of the hormones have hitherto not been prepared. However, for instance by acetylation of the raw oil obtained from follicle liquor Doisy, Ralls and Jordan ("Endocrinology"— 1926, No. 10, p. 273) obtained an oily acetyl derivative, while Butenandt in his publication cited above described an oily benzoate obtained by benzoylating a raw hormone oil recovered from the urine of pregnant women and having an efficiency of one million mice units per gram.

In view thereof it is the more surprising that it is nevertheless possible to produce by a similar treatment crystallized esters directly from the crude hormone oils. We have found that crystallized esters of the germinal gland hormones are also obtained from crude hormone oils and even from oils having a far lower efficiency than the oil used by Butenandt, if the crude oil is first converted by a treatment with alkali on the one hand into a readily separable neutral constituent on the other hand into the alkali metal salt of the follicle hormone, the solution of which is thereafter treated directly with an acylating agent.

In practicing our invention we may for instance boil the raw hormone with a dilute watery caustic alkali solution and separate the neutral part from the watery alkaline hormone solution by filtration. Alternatively we may dissolve the raw hormone oil in a solvent, such as for instance ether, immiscible with water and shake the solution with a more concentrated solution of caustic alkali, the neutral part then remaining dissolved in the ether solution, while the hormone passes into said caustic alkali solutions from which it is precipitated in the form of its alkali metal compound, provided the concentration of the caustic alkali solution is sufficiently high. After separation of the ether hormone solution from the alkali metal salt of the hormone this latter salt is dissolved in water and the solution acted upon with an acylating agent.

We wish it to be understood that the raw hormone oils contain different follicle hormones, amongst others also the follicle hormone hydrate and/or their derivatives and that the term "follicle hormone" as used in the specification and the claims appended to it is intended to cover all these hormones.

Example 1

10 grams of a hormone oil having an efficiency of about 300,000 mice units per gram are heated with a 5% aqueous caustic potash solution. After cooling, the alkaline solution is freed from non-dissolved oil by filtration and benzoylated in the usual manner according to Schotten-Baumann's method. The product of reaction, which has separated out, is taken up with ether. After evaporation of the ether there is left a light yellow oil which crystallizes when being triturated with alcohol. There are obtained about 0.7 to 0.8 gram. By recrystallization of the raw crystals from ethanol the benzoate of the follicle hormone is obtained in pure condition.

Example 2

10 grams of a hormone oil having an efficiency of about 250,000 mice units per gram are dissolved in 500 ccms. ether and the solution is thoroughly shaken with 10 grams of a 40% caustic soda solution. After separation of the ether solution from the smeary or pulverulent alkali metal salt, the ether solution can be evaporated to recover the neutral substances. The alkali metal compounds are dissolved in about 100 parts water and to the solution benzoyl chloride is added under vigorous agitation. When the reaction has come to an end, the benzoate of the follicle hormone has partly settled down as a fine powder and may now be separated from the alkaline mother liquor by filtration. After thorough washing with water it is crystallized from alcohol, the yield being 0.4 to 0.6 gram. It melts at 204° C. after having previously sintered at about 200° C.

Example 3

10 grams of a hormone oil having an efficiency of about 300,000 mice units per gram are heated with a 5% aqueous potash solution. After cooling, the alkaline solution is freed from undissolved oil by filtration and acetylated with acetyl chloride in the usual manner according to Schotten-Baumann's method. The precipitated product of reaction is taken up with ether. After evaporation of the ether there remains over a light yellow oil which crystallizes when triturated with alcohol. The pure acetate of the follicle hormone is obtained by recrystallizing the raw crystals from dilute ethanol.

Various changes may be made in the details disclosed in the foregoing specification without departing from the invention or sacrificing the advantages thereof.

We claim:—

1. The method of producing crystallized esters of the follicle hormones comprising reacting the raw hormone oil with an alkali, separating the alkali metal compound of the hormones thus formed from the neutral constituents, subjecting said compound in aqueous solution to acylation and causing crystallization of the acyl derivative of the hormone.

2. The method of producing crystallized esters of the follicle hormones comprising dissolving the corresponding raw hormone oil first in a solvent immiscible with water, treating the solution with an alkali, separating the solvent from the precipitated alkali metal salt by decantation, dissolving the alkali metal salt in water, subjecting the aqueous solution thus formed to acylation and causing crystallization of the acyl derivative of the hormone.

3. In the recovery of crystallized esters of the follicle hormones from a starting material of the group consisting of raw hormone oils and solutions containing the follicle hormones, the process which comprises separating the alkali-reactive constituents of such a starting material from the remaining constituents by treating said starting material with a caustic alkali, subjecting the alkali metal compounds of the follicle hormones thus formed to acylation in aqueous solution and causing crystallization of the acylated product.

ERWIN SCHWENK.
FRIEDRICH HILDEBRANDT.